Figure 1:
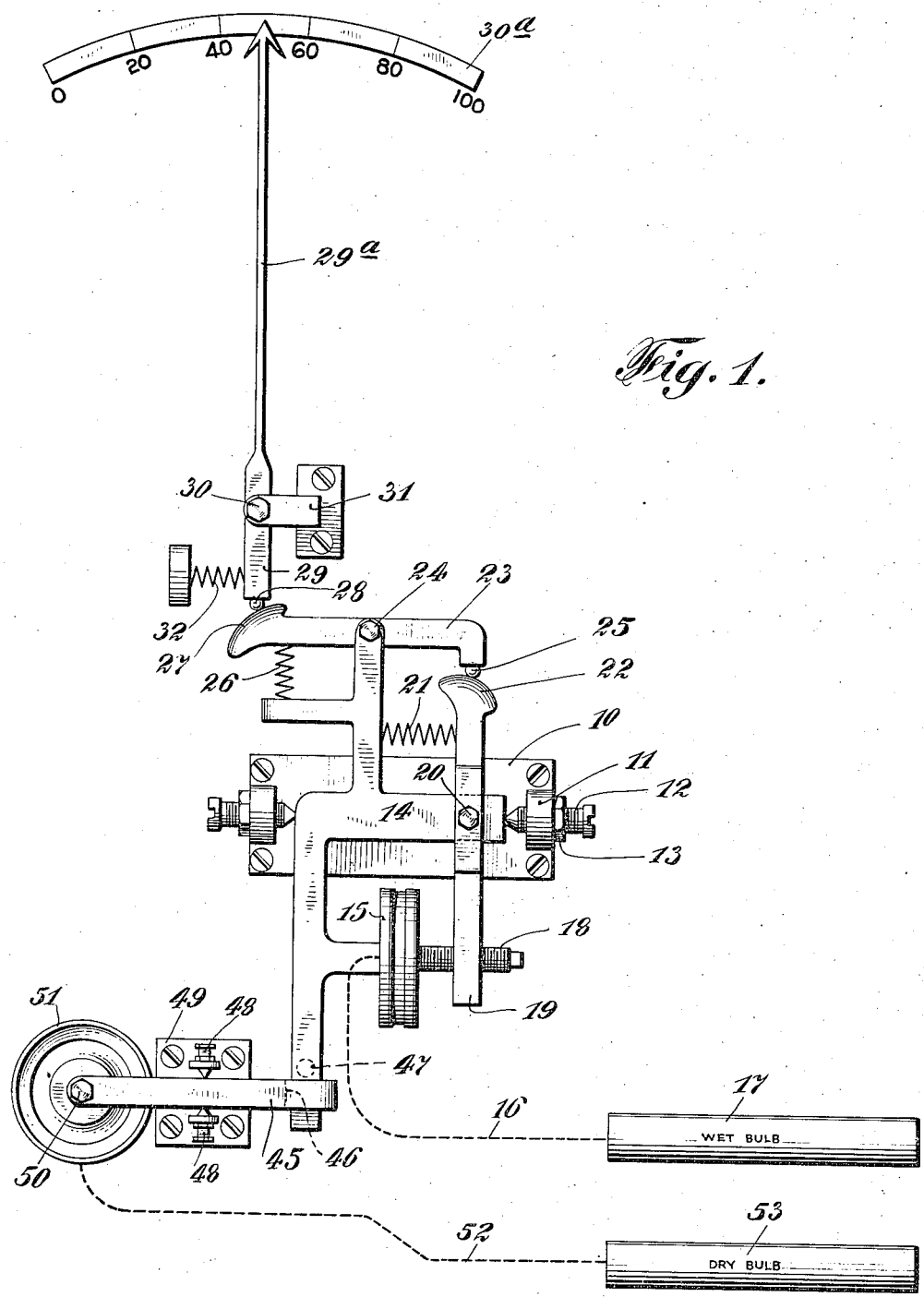

May 1, 1923.

H. P. MILKER 1,453,688

INSTRUMENT OF PRECISION

Filed Dec. 2, 1921

7 Sheets-Sheet 3

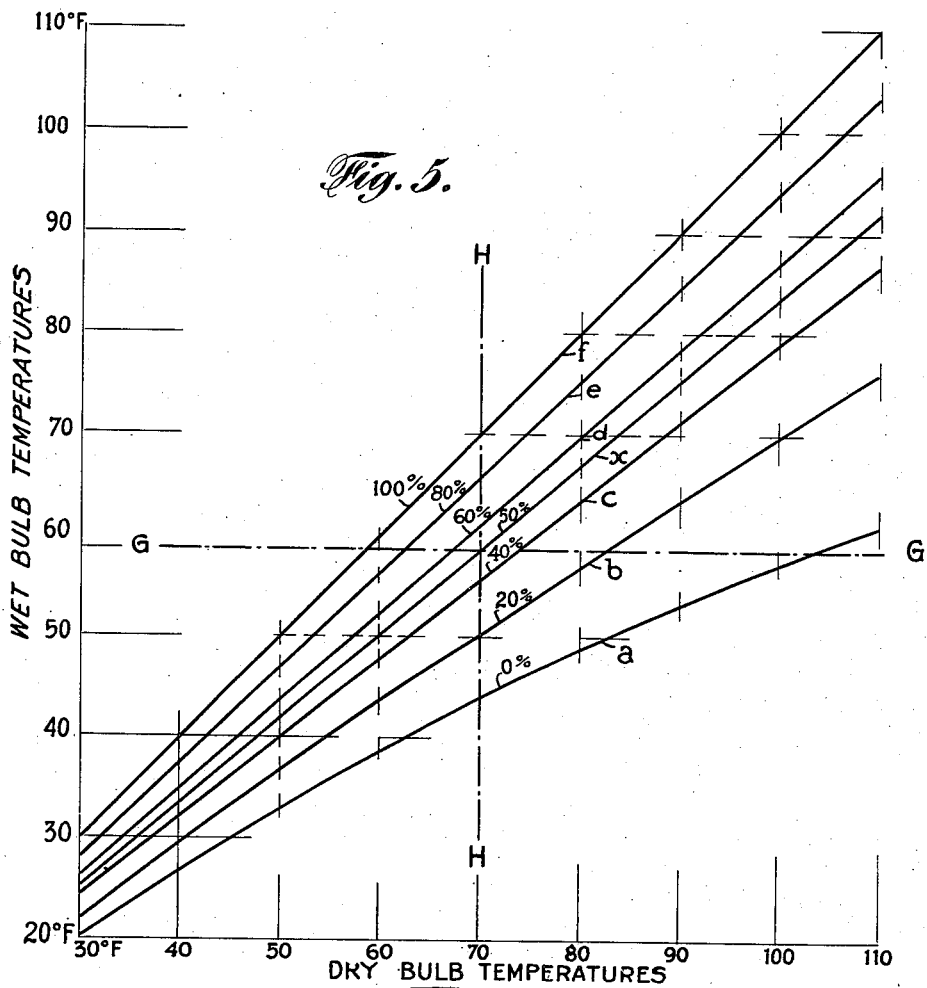
Fig. 5.
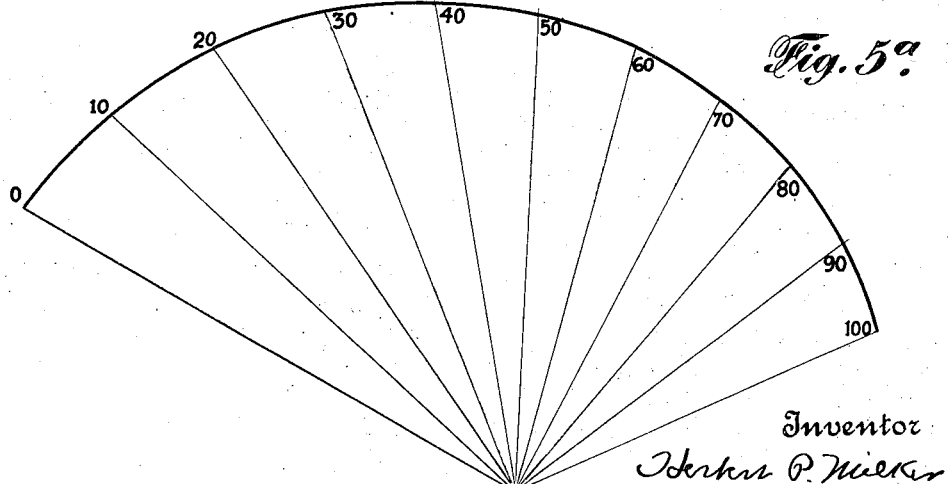
Fig. 5ᵃ.

May 1, 1923.
H. P. MILKER
INSTRUMENT OF PRECISION
Filed Dec. 2, 1921
1,453,688
7 Sheets-Sheet 5
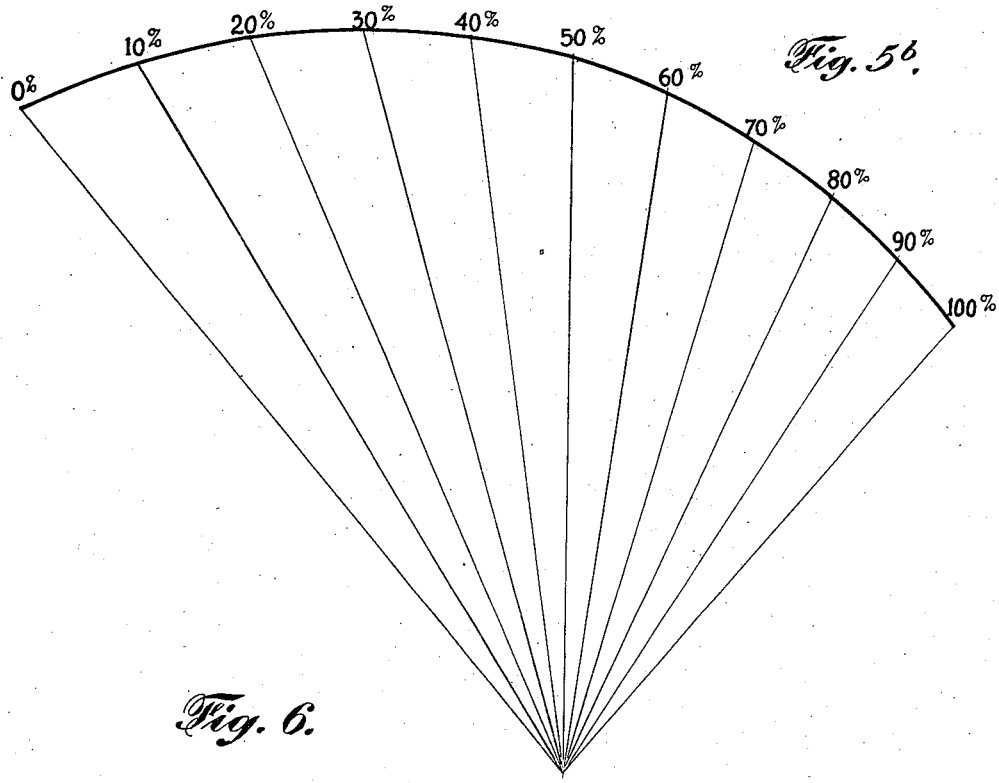
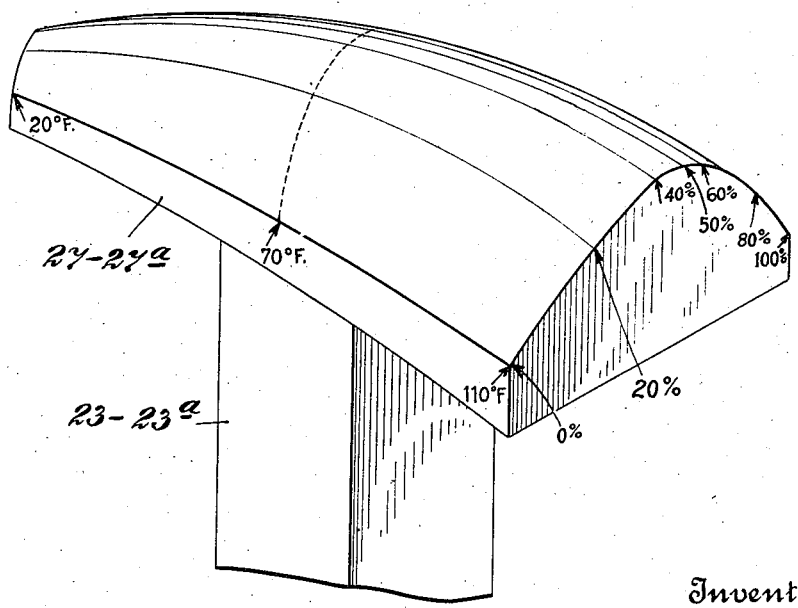
Inventor
Herbert P. Milker
By his Attorneys May 1, 1923. 1,453,688

H. P. MILKER

INSTRUMENT OF PRECISION

Filed Dec. 2, 1921 7 Sheets-Sheet 6

Inventor
Herbert P. Milker
By his Attorneys

May 1, 1923.

H. P. MILKER

INSTRUMENT OF PRECISION

Filed Dec. 2, 1921

1,453,688

7 Sheets-Sheet 7

Inventor
Herbert P. Milker
By his Attorneys

Patented May 1, 1923.

1,453,688

UNITED STATES PATENT OFFICE.

HERBERT P. MILKER, OF BROOKLYN, NEW YORK, ASSIGNOR TO CHARLES J. TAGLIA-BUE MANUFACTURING CO., OF BROOKLYN, NEW YORK, A CORPORATION OF NEW YORK.

INSTRUMENT OF PRECISION.

Application filed December 2, 1921. Serial No. 519,365.

*To all whom it may concern:*

Be it known that I, HERBERT P. MILKER, a citizen of the United States, and resident of the borough of Brooklyn, county of Kings, city and State of New York, have invented certain new and useful Improvements in Instruments of Precision, of which the following is a specification.

My invention relates to precision instruments and has for its object to provide a simple and novel mechanism whereby a predetermined result dependent upon the maintenance of an approximately fixed constant resulting from two variables is automatically provided in an efficient and reliable manner. Other more specific objects of the invention will appear from the description hereinafter and the features of novelty will be pointed out in the appended claims.

For the purpose of illustration and without any intent to define the limits of the invention, I have chosen a hygrometric apparatus of the dry and wet bulb type as a basis for the description. It is well known that in the case of a wet bulb thermometer, the temperature thereof varies definitely with the humidity and that for a fixed air temperature a curve covering the humidity may be plotted which will follow the temperature of a wet bulb for any degree of humidity from complete saturation to absolute dryness, each degree of air (dry bulb) temperature, however, having its own particular curve. In applying the present invention to this type of instrument an apparatus of simple form and maximum efficiency is provided whereby, in spite of the endless variety of such or similar curves, the humidity may be directly indicated or recorded with precision or be accurately regulated automatically at any and every air temperature, because the inherent inaccuracy of a device which is intended to automatically maintain a certain (manually set) difference between the dry bulb temperature and the wet bulb temperature is not present in this invention. The latter automatically regulates the humidity by maintaining the wet bulb temperature required for the desired humidity at a certain air (dry bulb) temperature and is arranged to automatically do so at any air temperature. For example, in a hygrostat of differential type arranged to maintain a definite differential between the dry bulb and wet bulb temperatures, said differential may be 10° F., i. e., a dry bulb temperature of 70° F. and a wet bulb temperature of 60° F., equivalent to 55% relative humidity. However, with such differential type device, if said 70° F. air temperature decreases, the relative humidity also decreases only slightly for a small drop in air temperature; at 32° F. air temperature the relative humidity is only 2% with the same differential of 10° F. Similarly, if the air temperature increases to any extent the humidity also increases in a certain ratio, being 81% for a 10° F. differential at 200° F. air temperature. Therefore, such differential type hygrostats do not function at all accurately when the air temperature fluctuates to any extent; this fault is overcome by this invention in which, preferably, any difference in temperature between the dry bulb (air) temperature and the wet bulb temperature is ignored, the humidity being maintained, in this case, by keeping constant the corresponding wet bulb temperature at any existent air temperature. For instance, with this invention arranged to act as a hygrostat, and set to automatically maintain 55% relative humidity, if the air temperature were 70° F., the wet bulb temperature would be 60° F., a difference of 10° F., which difference, however, would be 7° F. if the air temperature dropped to 50° F. (for said same 55% relative humidity) and 13° F. if the air temperature increased to 90° F. (for said same 55% relative humidity). Said temperature difference would be still further away from the original quoted difference of 10° F. between dry and wet bulb, namely: less than 1° F. at minus 11° F. air temperature and as much as 28° F. at 212° F. air temperature for 55% relative humidity in both cases. In other words, with this invention, any predetermined humidity is maintained by mechanically following the equivalent of a certain curve which corresponds to the wet bulb temperature for a particular humidity at a particular air temperature, which latter, if it varies, is automatically adjusted so that the exact humidity for which said invention is set is maintained strictly in accordance with the existent wet bulb temperature for the required humidity at the existent air (dry bulb) temperature.

Furthermore, by means of this invention, an accurate indicating or recording hygrometer of dry and wet bulb type is attained which gives direct readings of any humidity indication based on the reliable wet and dry bulb principle instead of either making it necessary to refer to a chart or make a computation or else be dependent on the unreliability of the expansion and contraction, due to more or less absorption of moisture, of an actuating member instead.

Figure 2:
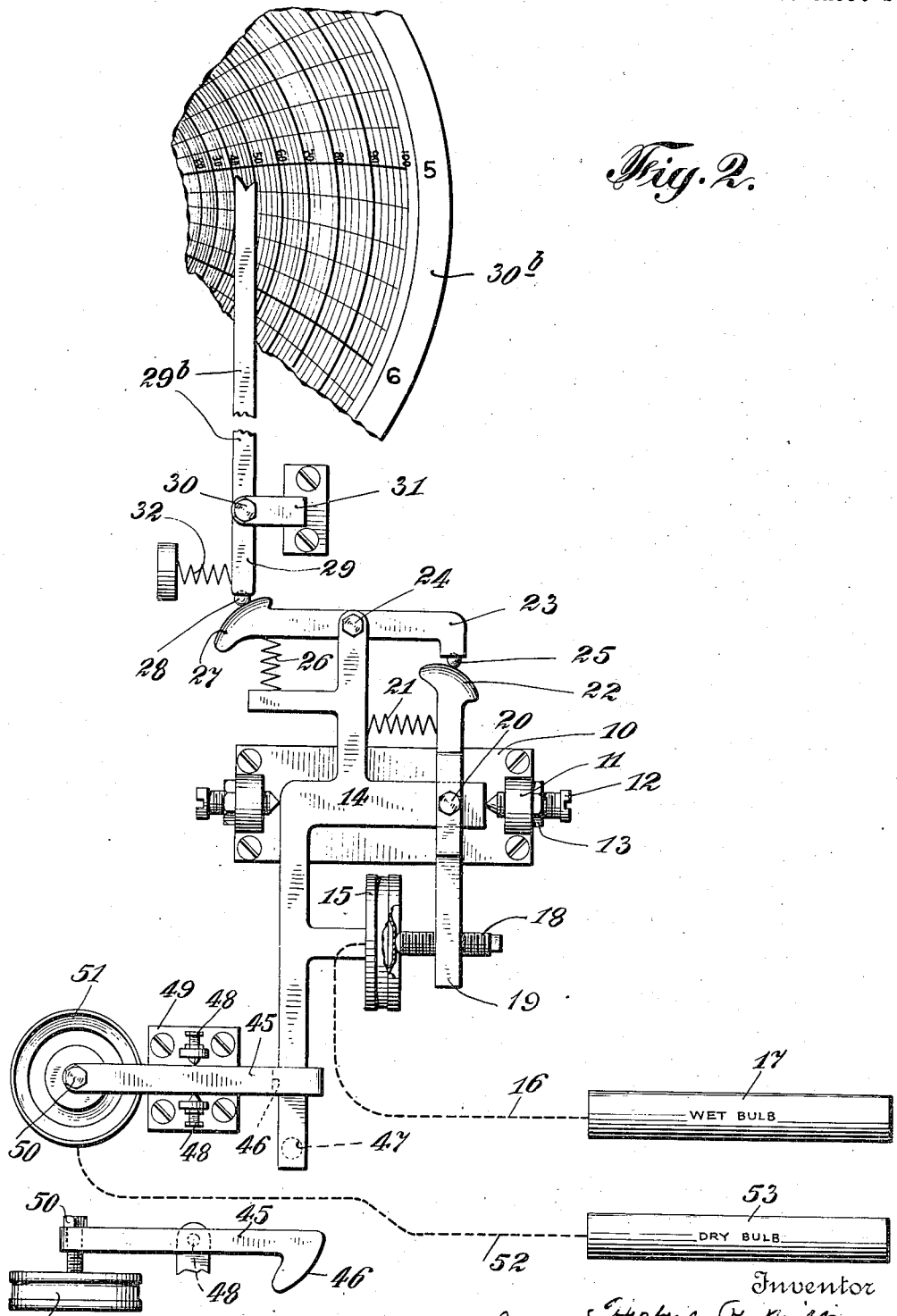
Figure 3:
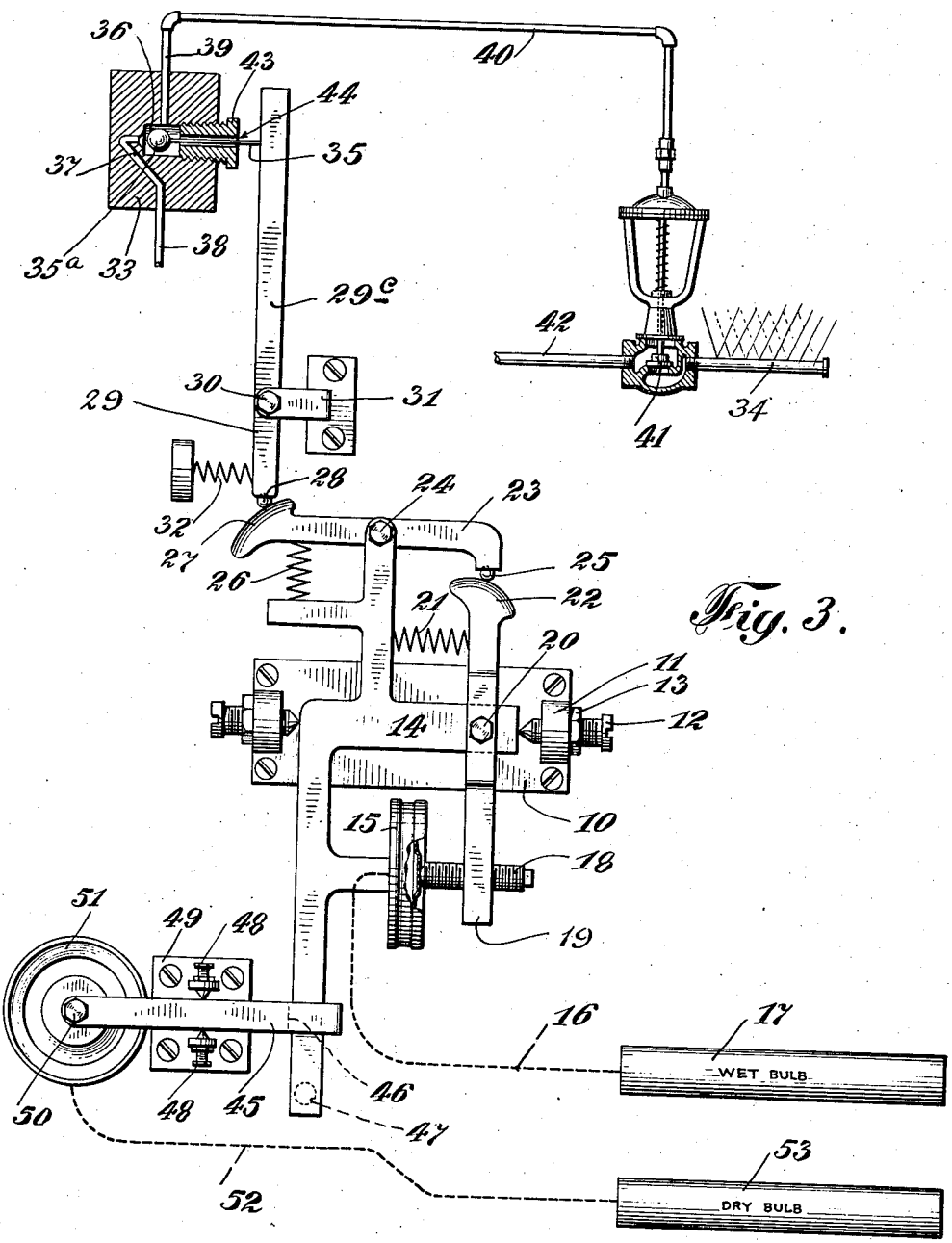
Figure 7:
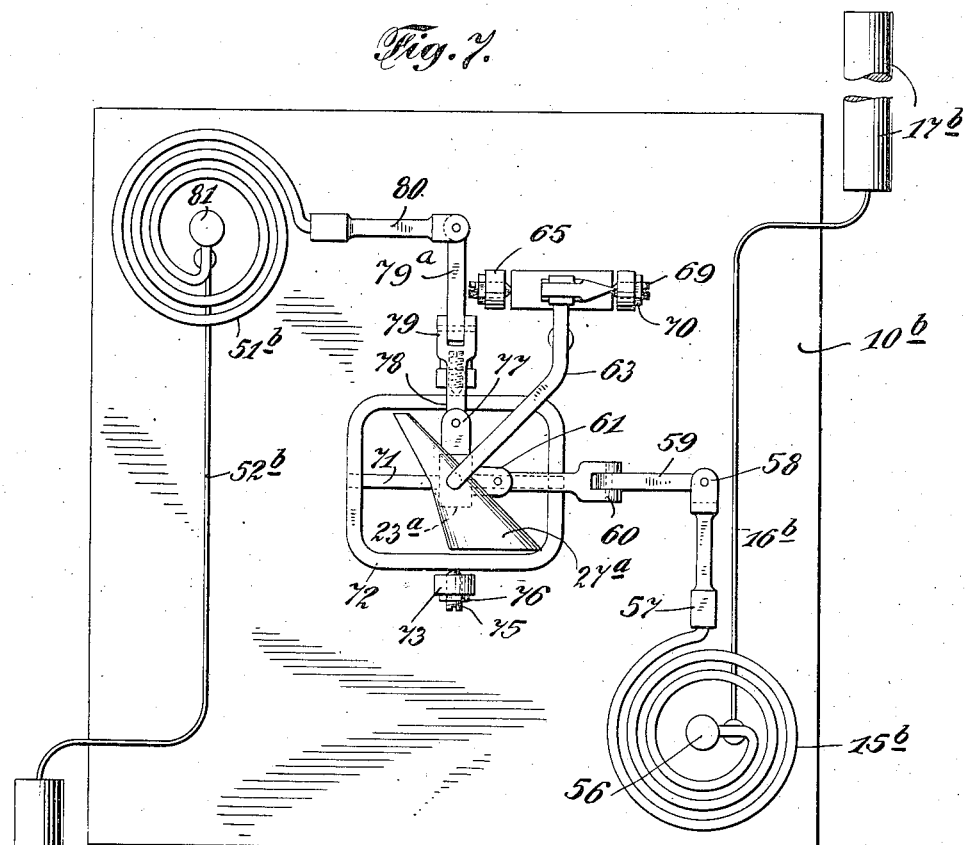
Figure 8:
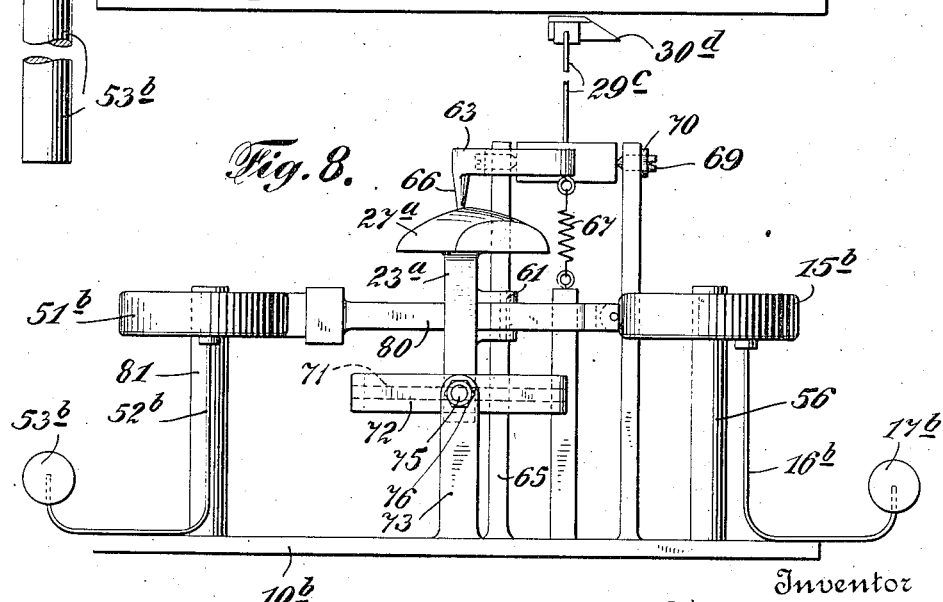
Figure 9:
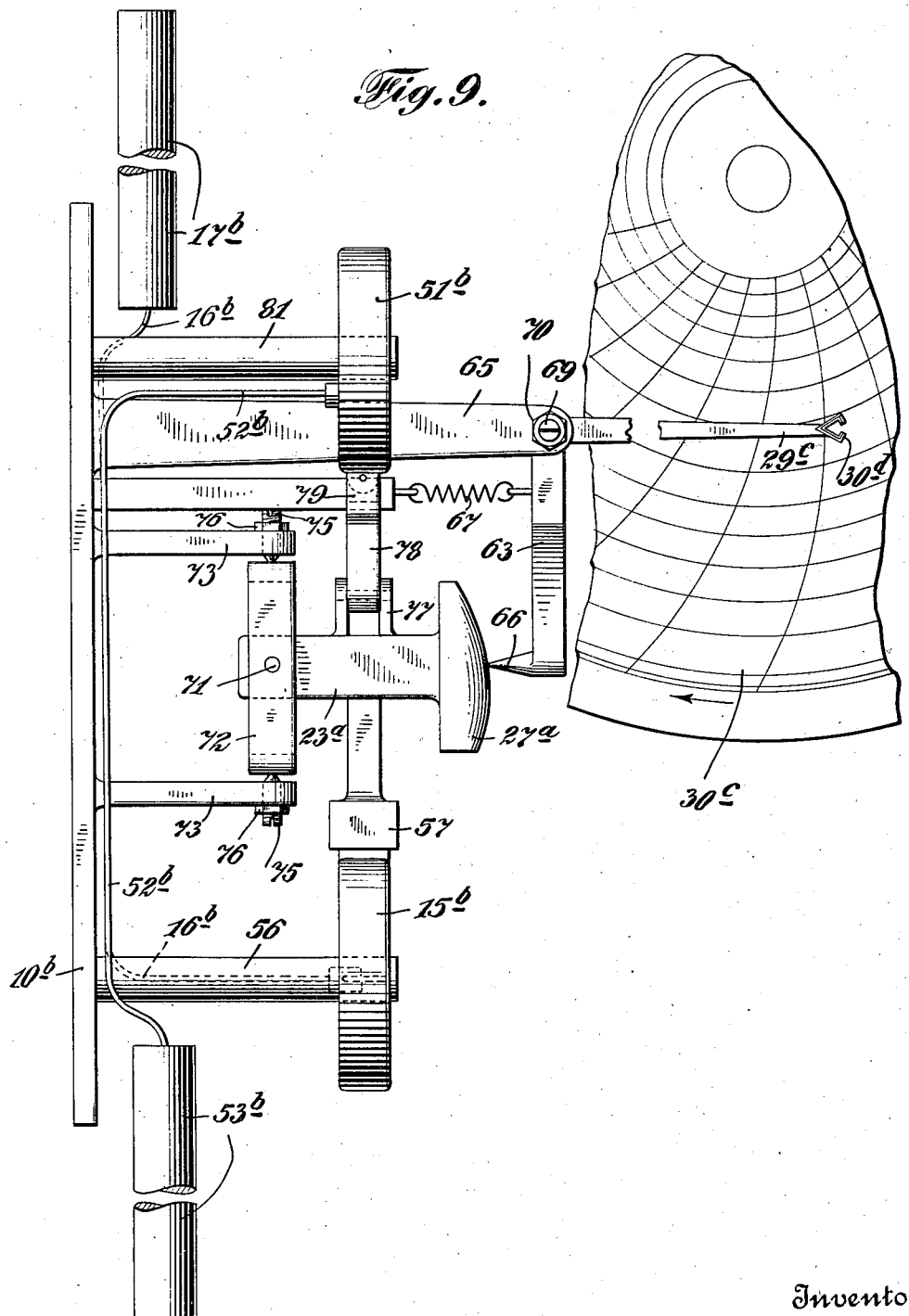

In the accompanying drawings, which illustrate specific embodiments of a hygrometric apparatus constructed in accordance with my invention without defining its limits in this particular field, Figures 1, 2 and 3 are diagrammatic elevations of the apparatus, all structurally arranged in the same form and in three different installations; Fig. 4 is a detail view of a part of the structure shown in Figs. 1, 2 and 3; Figs. 5, 5$^a$ and 5$^b$ are diagrammatic views illustrating in curves the wet bulb temperatures and the contours of a preferred form of cam which is a part of the hygrometric apparatus; Fig. 6 is a perspective view of the controlling element or cam; and Figs. 7, 8 and 9 illustrate another form of the invention constructed as a recording hygrometer but adaptable, as well, to the form of an indicating hygrometer or a hygrostat shown in Figs. 1 and 3.

As shown in Figs. 1, 2 and 3, the apparatus comprises typically a support 10 of any suitable type provided with bearings 11 in which pivot centres in the form of screws 12 are adjustably mounted and secured in an adjusted position, for instance, by means of lock nuts 13. A frame 14 is pivotally mounted upon said pivot screws 12 and carries a sensitive device, for instance, in the form of a capsular spring 15, which is connected by means of a capillary tube 16, with a wet bulb 17 of any conventional form and which is kept moist in the customary manner by means of a cloth covering fed with water by a wick which dips into a reservoir or in any other method desired. This arrangement being well known and, per se, forming no part of the present invention, it has not been considered necessary to more specifically illustrate the same. The capsular spring 15 co-operates with an adjustable stud 18 in the form, for instance, of a threaded screw adjustably fixed upon a lever 19 which is pivoted at 20 upon the frame 14. The stud 18 is maintained in contact with the capsular spring 15 by means of a spring 21 which bears against the lever 19; the latter is provided at its one end with a cam 22 of suitable form for the purpose desired. A second lever 23 is pivoted at 24 upon a suitable portion of the frame 14 and it is preferred that at its one end it be provided with a roller 25 which engages the cam 22 and is maintained in such engagement by means of a spring 26 effective upon the lever 23. At its other end, the lever 23 carries a compound cam 27 which will be referred to more in detail hereinafter. The compound cam 27 is preferably engaged by a ball 28 mounted for universal rotation in an arm 29 pivoted at 30 upon a suitable bracket 31 and controlled by means of a spring 32 whereby the ball 28 is maintained in engagement with the compound cam 27. The arm 29 may constitute a pointer 29$^a$ adapted to swing across an arc and to co-operate with a suitably graduated scale 30$^a$ whereby the degree of humidity is indicated, as shown in Fig. 1. The arm 29, instead of being constructed in the form of a pointer may, as shown in Fig. 2, comprise a pen arm 29$^b$ provided at its free end with the customary pen arranged to transcribe a line across the chart 30$^b$ which is rotatably actuated by means of suitable clock work in the well known way. In the two embodiments so far referred to, the arm 29, in co-operation with either the scale 30$^a$ or the chart 30$^b$, represents an indicating and recording means respectively. In Fig. 3, the apparatus is arranged for an automatic controlling device in which the arm 29 is in the form of a lever 29$^c$ which is utilized to control an air valve 33 for admitting more or less moisture to a spray head 34 to automatically maintain and control the humidity as required. Any desired arrangement may be combined with the apparatus for this purpose; for instance, as shown in Fig. 3, the lever 29$^c$ may be held in contact, by the spring 32, with the stem 35 of the air valve 33 provided with a chamber 36 having an inlet 37 connected, by means of a pipe 38, with a source of air under pressure and an outlet 39 connected by means of a pipe 40 with a diaphragm motor valve 41 of any well known type located in the spray line connection 42 whereby the spray head 34 is supplied with moisture. The stem 35, by fitting loosely in the bushing 43 which forms part of the air valve 33, provides an exhaust passage 44 for the escape of the air at the proper time, as will appear more fully hereinafter. The inlet 37 and the exhaust passage 44 are controlled by means of a valve ball 35$^a$ located in the chamber 36 and engaged by the inner end of the stem 35.

In all of the arrangements so far referred to, the frame 14 is maintained in contact with a cam 46 by means of a spring 47, the cam forming an integral part of a lever 45 pivotally mounted upon adjustable centres carried by a suitable bracket 49; the axis represented by the centres 48 extends at right angles to the axis represented by the pivot screws 12, as clearly shown in Figs. 1, 2 and 3. Cam 46, together with the members which actuate same, is shown in another view in Fig. 4 which more clearly diagrams said parts. The lever 45 carries an adjustable abutment in the form of a screw 50 which engages a second sensitive member 51 which also may be in the form of a capsular spring suitably mounted upon a fixed support and connected by means of a capillary tube 52 with a dry bulb 53 of any well known type.

In a preferred form, the active face of the compound cam 27 is constructed in the form of contiguous curves which correspond (directly or indirectly) to the temperature of the wet bulb for all percentages of humidity at different degrees of air (dry bulb) temperature, as illustrated and explained more fully hereinafter.

In practice, the bulbs 17 and 53 are suitably supported in the desired location and connected with the apparatus by the capillary tubes 16 and 52, which are of the necessary length to reach the apparatus, it being understood that the latter may be supported in any convenient and readily accessible location. In the illustrated examples shown in Figs. 1, 2 and 3, it is assumed that the bulbs 17 and 53 contain fluids which expand and contract with changes in temperature and which, together with the fluid contained in the capillary tubing 16 and 52 and in the capsular springs 15 and 51, bring about corresponding pressure changes resulting in expansion and contraction in the latter. In operation, any changes of temperature at the wet bulb 17 will, therefore, cause the capsular spring 15 to expand or contract, and by communicating its movement to the stud 18 to swing the lever 19 upon its pivot 20; the pivotal movement of the lever 19 is translated by its cam 22 and communicated to the lever 23 by means of the roller 25, and causes said lever 23 to swing upon its pivots 24. The pivotal movement of the lever 23 is translated by whatever part of the surface of the compound cam 27 the ball 28 happens to be in contact with, and is transmitted by said ball 28 to the arm 29, which is accordingly swung upon its pivot 30. If the arm is in the form of a pointer 29ª, the extent of such movement will be indicated upon the scale 30ª and will thereby indicate the degree of humidity in the air at this time; if the arm 29 is in the form of a pen arm 29ᵇ, the result of the movement will appear in the form of a line upon the chart 30ᵇ. If, on the other hand, the arm is constructed in the form of a lever as 29ᶜ, it will co-operate with the stem 35 to either move the valve ball 35ª toward the inlet 38 and thereby throttle the air pressure and thus permit the diaphragm motor valve 41 to be opened by the action of its spring to admit more moisture to the spray head 34 and thus increase the humidity or it will permit said valve ball 35ª to move toward the exhaust passage 44 whereby the air pressure which reaches the diaphragm motor valve 41 is increased, thus closing the same and reducing the supply of moisture, which reaches the spray head 34 and correspondingly reducing the degree of humidity in the air. Both the type of valve 33, diaphragm motor valve 41 and the described method of operation are well known and need no further description as, specifically, they form no part of the present invention.

It is, of course, well known that the temperature of the wet bulb bears a certain direct relationship to the humidity at a fixed air temperature. Assuming, therefore, that there is no change in the air temperature (dry bulb), the action obtained by the parts described will be as above set forth; that is to say, when the humidity increases, less evaporation takes place on the surface of the bulb 17 and therefore results in an increase of temperature thereat, which causes the member 15 to expand and communicate its motion to the stud 18 and its co-related parts, as previously set forth. When, on the other hand, the humidity decreases, a greater degree of evaporation takes place on the surface of the wet bulb 17 and consequently causes the member 15 to contract, this contracted movement being followed by the stud 18 under the influence of the spring 21 and resulting in a corresponding operation of the connected parts. In the foregoing, it might be assumed, for instance, that the air temperature remained constant at, say, 70° F. and the humidity increased from absolute dryness to a complete saturation, that is, from 0% to 100% relative. At 0% there would exist at the surface of the wet bulb 17 a temperature of approximately 44° F. and said wet bulb temperature would definitely increase as the percentage of humidity increased, finally reaching the same temperature as the dry bulb for a 100% relative humidity. This definite curve of wet bulb temperature is shown at H—H in Fig. 5 and the contour of that portion of a preferred form of compound cam 27 which, in such case, would contact with the ball 28, would, in effect, correspond to such curve. Said Fig. 5 also shows approximately in diagrammatic plan view, by the line X, the path on the active surface of such compound cam 27 along which the ball 28 will contact to cause 50% relative humidity to be indicated for all air temperatures between 30 and 110° F., it being assumed, for the purpose of illustration, that said contact ball 28 would travel an equal extent in linear direction for each degree change in either wet or dry bulb temperature. Similarly, lines $a$, $b$, $c$, $d$, $e$ and $f$ of Fig. 5 show the relative paths for 0%, 20%, 40%, 60%, 80% and 100% relative humidity, respectively, all lines in Fig. 5 being plotted as though they appeared on a plane surface instead of on the curved surface of said compound cam 27 and, therefore, not appearing in true plan view which latter would show the lines distorted, because variably foreshortened, and therefore would probably make said illustration less clear.

Fig. 5$^a$ is a diagrammatic view corresponding to Fig. 5 showing in elevation the approximate contour of the active surface of a section of the same compound cam 27 along the line G—G of Fig. 5, as viewed from the position equivalent to the top edge of Fig. 5. Fig. 5$^b$ is another diagrammatic view, also corresponding to Fig. 5, showing in elevation the approximate contour of the active surface of a section of compound cam 27 along the line H—H of Fig. 5, as viewed from the position equivalent to the right-hand side of Fig. 5. Fig. 6 shows a pictorial representation, in perspective, of Fig. 5.

For a different air temperature than the assumed 70° F. previously mentioned, the ball 28 would contact with a different contour of compound cam 27, as made clear by the foregoing illustrations mentioned, in order to produce an accurate indication, record or regulation; this is taken care of as follows:

If the temperature changes at the dry bulb 53, the capsular spring 51 will be correspondingly expanded or contracted, and accordingly will pivotally swing the lever 45 and thereby cause the cam 46 to act upon the frame 14. In this manner, the latter is swung upon its pivots 12 in a direction to move the compound cam 27 in an arc transverse to the plane in which the arm 29 is pivotally movable by the wet bulb. This brings a different portion of the compound cam 27 or, in other words, a different contour thereof into contact with the ball 28 of the arm 29. The particular contour of the compound cam 27 presented for contact with the ball 28 and consequently with the arm 29 when a change in air temperature is registered by the dry bulb 53 is, of course, in each case, a contour which is correct for all wet bulb depressions at that particular air temperature. Any actuation of the apparatus resulting from changes in wet bulb temperature will accordingly operate the apparatus in a manner to correctly indicate or record such changes or to regulate the diaphragm motor valve accordingly. When the apparatus is constructed for the purposes of controlling the degree of humidity, for instance, as shown in Fig. 3, the stud 18, in addition to its other functions, may serve also to change the adjustment of the hygrostatic apparatus illustrated; that is to say, by turning the stud inwardly, the capsular spring 15 will have to expand less to cause the moisture valve 41 to close and by turning said stud outwardly, the capsular spring will have to expand to a greater degree to cause said moisture valve to close. Also, any suitable arrangement may be provided for bringing the arm 29$^c$ into contact with the valve stem 35 sooner or later, as desired, for the purpose of adjustment.

By means of the preferred individual cams 22 and 46 it is possible to use a compound cam 27 and a scale 30$^a$ on chart 30$^b$ which are always identical in any number of the instruments, as the cams 22 and 46 may be readily cut to suit the individual requirements of the capsular springs 15 and 51. As the compound cam 27 is more or less complicated in contour, it is desirable to standardize the same, which is made possible by the interposition of the cams 22 and 46 as described.

In addition to the preferred use of the wet bulb temperature for indicating, recording or controlling the corresponding humidity for a particular air temperature together with the use of the dry bulb temperature for automatically bringing into action the mechanical expression of the wet bulb temperature existent, which corresponds to a particular humidity at the dry bulb temperature prevailing, said dry bulb may also be used, if desired, in case of an automatic regulator, for automatically controlling the air temperature as closely as conditions permit. It will, of course, be apparent that many mechanical equivalents for carrying out the principle above set forth may be substituted for the forms illustrated in Figs. 1, 2 and 3; thus, the forms shown by Figs. 7, 8 and 9, for instance, may be employed, and it is therefore to be understood that all the forms shown and described are to be viewed only as illustrative of means whereby the novel principle may be made use of in a simple, accurate manner.

Figs. 7, 8 and 9 are diagrammatic views of a modification of the structure arranged for a recording hygrometer which, in the same manner as before stated, is also capable of arrangement for either an indicating hygrometer or an automatic humidity controller (hygrostat) by simply arranging the operating arm accordingly. In said figures, as before, no attempt is made to show any exact multiplication of leverages nor are the various parts drawn to the same scale, some distortion being shown for the sake of clarity. The arrangement shown comprises a support 10$^b$ of any suitable form, provided with posts 56 which carry a sensitive member 15$^b$ illustrated, in this instance, in the form of a spiral tube connected by means of a capillary tube 16$^b$ with a wet bulb 17$^b$ of any conventional form and which is kept moist in any convenient manner, as mentioned previously. The sensitive member 15$^b$ is provided with an extension 57 which is jointed at 58 to an arm 59; the latter is provided with a universal joint 60 constituting part of a lever which, by means of a joint 61, is connected to a lever 23ª carrying a compound cam 27ª of suitable form for the purpose desired, and being, for instance, of a contour similar to that previously described. Another arm 63 is pivoted between posts 65 and at its one end is provided with rider or cam follower 66 which contacts with the active face of the compound cam 27ª and is maintained in contact therewith by a spring 67 effective upon the arm 63. At its other end the arm 63, while it may be attached to a pointer (29ª of Fig. 1) to swing across an arc of a suitably graduated scale whereby the humidity is indicated, or attached to a transmitting lever (29ᶜ of Fig. 3) for automatically controlling the humidity, in this case is shown as actuating the pen arm 29ᶜ for making a record on chart 30ᶜ, by means of pen 30ᵈ, of a recording hygrometer. Pivot centres in the form of screws 69, adjustably mounted and secured, for instance, by lock nuts 70, may be used for pivotally mounting the arm 63 between the posts 65. The lever 23ª, upon which the compound cam 27ª is mounted, is carried by a shaft 71 mounted within the frame 72, which latter is also pivotally supported on an axis at right angles to the axis of the pivot shaft 71, by means of the posts 73 provided with bearings 74 in which pivot centres, in the form of screws 75, are adjustably mounted and secured, for instance, by lock nuts 76. Another universal joint 77, also attached to the lever 23ª, connects with another arm 78 which is jointed at 79 to a link 79ª; the latter, in turn, is attached to another extension 80 connected with a second sensitive member 51ᵇ, typified also in the form of a spiral tube, suitably mounted upon a post 81, and connected by means of a capillary tube 52ᵇ with a dry bulb 53ᵇ of any well known type.

As with Figs. 1, 2 and 3, it is to be understood that the bulbs 17ᵇ and 53ᵇ are suitably supported in the desired location, that the capillary tubes 16ᵇ and 52ᵇ are of suitable length and that said bulbs, capillary tubing and the sensitive members 15ᵇ and 51ᵇ contain a suitable fluid for moving said members 15ᵇ and 51ᵇ in response to temperature changes at said bulbs 17ᵇ and 53ᵇ. With the foregoing in mind, therefore, any changes of temperature at the wet bulb 17ᵇ will cause the spiral tube 15ᵇ to uncoil or recoil and, by communicating its movement to the extension 57, to move the lever 23ª upon its bearings 75. Said movement of the lever 23ª, imparted by the movement of said spiral tube 15ᵇ, causes the compound cam 27ª, which it supports, to move in directions which, for the sake of description, will be expressed as "right and left" directions in Fig. 7, causing the rider or cam follower 66 to be elevated or depressed because of the active contour of compound cam 27ª, already dwelt upon at length, against or in response to the pull of spring 67. This will cause said cam follower 66 to pivot at 69 and thereby cause the continuation of the cam follower 66, in the form of pen arm 29ᶜ (for instance) to function by inscribing a line, through the medium of the pen 30ᵈ, upon the revolving chart 30ᶜ. When in operation, any motion of the pen arm 39ᶜ caused only by a "right and left" motion of the compound cam 27ª will record a certain humidity upon the chart 30ᶜ, which will be the correct indication based upon the temperature of the wet bulb at the particular air temperature existent. When, however, the air temperature changes, thereby changing the corresponding humidity for the same wet bulb temperature and also changing the wet bulb temperature itself by changing the rate of evaporation at the wet bulb, an "up and down" motion is imparted to the compound cam 27ª in Fig. 7, because of said air temperature change, as follows: If the temperature changes at the dry bulb 53ᵇ, the spiral tube 51ᵇ will be correspondingly uncoiled or recoiled and accordingly will pivotally swing the lever 23ª, which is free to rotate upon the shaft 71, in an "up and down" direction in Fig. 7, and to an extent which will properly position the compound cam 27ª into the "right and left" axis of rotation underneath rider 66 so that by the rotation of said compound cam 27ª also along said "right and left" axis of rotation by means of the motion imparted by spiral tube 15ᵇ the final point, on the active surface of compound cam 27ª, underneath the rider 66, will correspond to the wet bulb temperature existent for a corresponding humidity at a particular (dry bulb) air temperature, without the motions or forces generated by the dry and wet bulbs acting in opposition or co-ordination with each other but with each bulb and each sensitive member influenced by each bulb acting in this case entirely independently of and free to move without in any way affecting the other.

The invention, in all of its hygrometric forms, is simple in construction and positive and reliable in operation and provides a direct reading, indicating and recording hygrometric apparatus whereby any relative or absolute humidity or other hygrometric phenomenon may be accurately read directly either by a dial and pointer or by a pen record on a chart at any humidity and at any temperature or whereby any desired humidity may be exactly maintained and automatically regulated under any fluctuations or variations of either the wet or dry bulb temperatures.

In addition to the explained usage of this device based upon a compound cam of the character shown, such compound cam or its equivalent may also find a new and useful application to instruments of precision for other purposes such as, for instance, automatic pressure-controlling instruments, or automatic temperature controllers for maintaining a certain fixed temperature that is in relationship to two variable temperatures, or an automatic controller for maintaining a certain fixed specific gravity of a liquid that is in relationship to two liquids of variable specific gravity, or in any other combination when the result desired is dependent upon a fixed constant being maintained, which is the result of two variables.

The apparatus may find usefulness in many fields, as stated, and requires no special skill in its control and operation and at the same time is economical to produce and maintain.

In the illustrated examples of the invention the dry and wet bulb temperatures constitute the two variables and the predetermined percentage of humidity which is desired represents the approximately fixed constant which is to be maintained.

Various modifications in the specific forms shown and described may be made within the scope of the claims without departing from the spirit of my invention.

I claim:

1. In an instrument of the kind described, means to be operated, a member for operating said means, mechanism whereby said member is actuated to bring about an operation of said means and mechanism whereby said member is adjusted to vary its operative effect upon said means in accordance with desired predetermined results.

2. In an apparatus capable of transmitting movements generated by pressure changes, a member movable in one plane by pressures from one source and also movable in another plane by pressures from another source, and means controlled by said member.

3. An instrument of the kind described comprising a movable member, controlled means for actuating said member in accordance with certain existing conditions, and controlled means whereby a relative adjustment between said first named controlled means and said member is automatically effected in accordance with certain other existing conditions to automatically maintain the resultant of said conditions approximately constant.

4. An instrument of the kind described, comprising a pivotally movable member, means for pivotally actuating said member including a controlled element, a device connected with the latter and controlling the same whereby said means is operated to actuate said member in accordance with certain existing conditions. mechanism including a controlled element, and a device connected with the latter and controlling the same whereby said means is adjusted relatively to said member in accordance with certain other existing conditions to automatically maintain the resultant of said conditions approximately constant.

5. A hygrometric apparatus comprising a movable member, himidity-controlled means for actuating said member in accordance with existing conditions of humidity and temperature-controlled means whereby a relative adjustment between said humidity-controlled means and said member is automatically effected in accordance with existing temperature conditions.

6. A hygrometric apparatus comprising a movable member, humidity-controlled means for actuating said member in accordance with existing conditions of humidity and temperature-controlled means adapted to adjust said humidity-controlled means relatively to said member in accordance with existing temperature conditions.

7. A hygrometric apparatus comprising a pivotally movable member, means for pivotally actuating said member including an expansible and contractible member, a wet bulb connected with the latter and controlling the same whereby said means is operated to actuate said member in accordance with existing conditions of humidity, mechanism including an expansible and contractible member and a dry bulb connected with the latter and controlling the same whereby said means is adjusted relatively to said member in accordance with existing temperature conditions.

8. A hygrometric apparatus comprising a movable member, humidity-controlled means for actuating said member in accordance with existing conditions of humidity and temperature-controlled means whereby a relative adjustment between said humidity-controlled means and said member is automatically effected in accordance with existing temperature conditions, and whereby temperature effects tending to produce a false actuation of said member are neutralized.

9. A hygrometric apparatus comprising a movable member, a support, a frame movably mounted thereon, humidity-controlled means carried by said frame for actuating said member in accordance with existing conditions of humidity and temperature-controlled means whereby said support is shifted to adjust said humidity-controlled means relatively to said member in accordance with existing temperature conditions.

10. A hygrometric apparatus comprising a pivoted member, a support, a frame pivotally mounted thereon, a first lever pivoted upon said frame, an operating cam carried by said lever and having a multiplicity of contiguous contours arranged to actuate said pivoted member, a second lever pivoted upon said frame, a cam carried by said second lever and adapted to actuate said first lever, an expansible and contractible member adapted to operate said second lever, a wet bulb connected with said expansible and contractible member and arranged to operate the same in accordance with existing conditions of humidity, whereby said pivoted member is correspondingly operated, a third pivoted lever, an expansible and contractible member and a dry bulb connected therewith to operate said third lever whereby said frame is pivotally shifted to adjust said operating cam relatively to said pivoted member in accordance with existing temperature conditions.

11. A hygrometric apparatus comprising a pivoted member, a support, a frame pivotally mounted thereon, a first lever pivoted upon said frame, an operating cam carried by said lever and having a multiplicity of contiguous contours arranged to actuate said pivoted member, a second lever pivoted upon said frame, a cam carried by said second lever and adapted to actuate said first lever, an expansible and contractible member carried by said frame and adapted to operate said second lever, a third pivoted lever, a cam carried thereby in engagement with said frame and a dry bulb connected with said second expansible and contractible member for operating said third lever and its cam to pivotally shift said frame and thereby adjust said operating cam relatively to said pivoted member in accordance with existing temperature conditions.

12. A hygrometric apparatus comprising a movable member, a cam for actuating same, said cam having a plurality of contiguous contours corresponding to humidity curves and transverse contours corresponding to temperature curves, humidity-controlled means for actuating said cam whereby said member is operated in accordance with existing conditions of humidity and temperature-controlled means whereby said cam is adjusted relatively to said member in accordance with existing temperature conditions.

13. The combination of a humidifying spray, means for controlling the same to vary the supply of humidifying agent to said spray, a pivoted lever operatively combined with said means, humidity-controlled means for actuating said lever to operate said spray-controlling means in accordance with existing conditions of humidity and temperature-controlled means adapted to adjust said humidity-controlled means relatively to said lever in accordance with existing temperature conditions.

14. In an instrument of the kind described, a movable member, a cam for actuating same, said cam having a plurality of contiguous contours corresponding to curves representative of certain conditions and transverse contours corresponding to curves representative of certain other conditions, means for actuating said cam whereby said member is operated in accordance with existing conditions of the first named type and means whereby said cam is adjusted relatively to said member in accordance with existing conditions of the second named type whereby the resultant of said conditions is automatically maintained approximately constant.

15. A hygrometric apparatus comprising a pivoted member, a support, a frame pivotally mounted thereon, a lever pivoted upon said frame to swing about an axis transverse to that of the frame, an operating cam carried by said lever and having a multiplicity of contiguous contours arranged to actuate said pivoted member, an expansible and contractible member carried by said frame and adapted to swing said lever about its axis relatively to said frame, a wet bulb connected with said expansible and contractible member and arranged to operate the same in accordance with existing conditions of humidity, whereby said pivoted member is correspondingly operated, a second expansible and contractible member adapted to coincidentally swing said lever and frame about the axis of the latter, and a dry bulb connected with said second named expansible and contractible member and arranged to operate the same whereby said lever is pivotally shifted to adjust said operating cam relatively to said pivoted member in accordance with existing temperature conditions.

In testimony whereof I have hereunto set my hand.

HERBERT P. MILKER.